2,999,120
VISCOSITY INDEX IMPROVING AGENTS

Donovan R. Wilgus, Richmond, Calif., assignor, by mesne assignments, to the United States of America as represented by the United States Atomic Energy Commission
No Drawing. Filed Nov. 12, 1958, Ser. No. 773,176
4 Claims. (Cl. 260—668)

This invention relates to new compositions of matter having improved viscosity index characteristics; in particular, this invention is directed to new compositions of matter which are effective to improve the viscosity-temperature characteristics, that is, the viscosity index (V.I.), of lubricating oil compositions.

The greater proportion of oils obtainable by refining processes and useful as base oils for lubricating oil compositions have wide variations in viscosity characteristics with changes in temperatures. They do not have agents specifically incorporated therein for the purpose of imparting reduced changes in viscosity with changes in temperature. That is, at a particular temperature, a lubricating oil may be quite viscous, while at higher temperatures the lubricating oil may have a viscosity of a fluid such as kerosene. In order that the viscosity of a lubricating oil composition will not change rapidly with changes in the temperature of an internal combustion engine, for example, numerous additives have been designed to modify the viscosity-temperature characteristics of lubricating oils. The changes in the viscosity occurring with variations in temperature are kept at a minimum.

It is a primary object of this invention to provide new compositions of matter particularly useful as V.I. improving agents.

In accordance with this invention, it has been discovered that new viscosity index improving agents are obtained by treating certain particular alpha, omega-diaryl alkanes with anhydrous aluminum chloride. The new compositions of this invention which are effective as viscosity index improving agents are the products obtained by treating alpha, omega-diphenyl alkanes with aluminum chloride.

The present invention comprises broadly the treatment of alpha, omega-diaryl alkanes with anhydrous aluminum chloride to produce oil soluble products which are useful as V.I. improvers for lubricating oil compositions, including lubricating oil compositions used in an atmosphere of nuclear radiation. These alpha, omega-diaryl alkanes are represented by the formula $$(A)_n—B—R—B—(A)_n$$

wherein R is a saturated hydrocarbon radical, including an aliphatic radical, containing from 6 to 12 carbon atoms; B is an aromatic radical; A is a hydrocarbon substituent on the aromatic nucleus containing from 1 to 8 carbon atoms; and n is a number from 0 to 3.

For purposes of this invention, it is preferred that R is an aliphatic radical containing from 6 to 12 carbon atoms, B is a phenyl radical, A is a saturated hydrocarbon radical containing from 1 to 8 carbon atoms, and n is a number from 0 to 3.

The R radicals include the divalent radicals obtained from hexane, heptane, octane, nonane, decane, dodecane, etc.

The B radicals include the following radicals: phenyl, biphenyl, naphthyl, tetralin, etc.

The A radicals include methyl, ethyl, propyl, isopropyl, butyl, tert-butyl, pentyl, hexyl, sec-hexyl, etc.

The alpha, omega-diaryl alkanes are exemplified by 1,6-diphenylhexane; 1,7-diphenylheptane; 1,8-diphenyloctane; 1,9-diphenylnonane; 1,10-diphenyldecane; 1,9-bis (isopropylphenyl) nonane; 1,9-bis(n-butylphenyl) nonane; 1,9-bis(sec-butylphenyl) nonane; 1,9-bis(tert-butylphenyl) nonane; 1,6-bis(sec-hexylphenyl) hexane; 1,9-bis (1,2,3,4-tetrahydronaphthyl) nonane; 1,9-bis(biphenyl) nonane, etc. When the aromatic radicals are phenyl radicals, the phenyl nucleus may be substituted with from 1 to 3 alkyl groups, such alkyl groups being on one or both of the benzene rings. Such alkyl substituents may be exemplified by n-propyl, isopropyl, n-butyl, isobutyl, sec-butyl, tert-butyl, amyl, etc.

Preferably, the alpha, omega-diaryl alkanes are alpha, omega-diphenyl alkanes, wherein the alkane radicals contain from the 6 to 12 carbons atoms, and the phenyl nucleus, in each instance, is unsubstituted.

The anhydrous aluminum chloride which is used in the formation of the viscosity index agents according to this invention is used in amounts of 8 mol percent to 80 mol percent, based on the alpha, omega-diaryl alkane. It is preferred to use from 8 mol percent to about 10 mol percent of anhydrous aluminum chloride per mol of alpha, omega-diaryl alkane.

A small amount of chloroform may be used with the aluminum chloride, for example, from about 10 mol percent to about 50 mol percent or greater, based on the aluminum chloride.

Other acid catalysts which can be used include $AlBr_3$, etc.

The reaction temperatures used in the treatment of the above-described alkanes by the anhydrous aluminum chloride is in the range of 2° C. to about 50° C. to as high at 150° C., preferably from about 2° C. to 50° C.

The new viscosity index improving agents of this invention can be prepared by treating an alpha, omega-diaryl alkane with from 8 mol percent to 80 mol percent of anhydrous aluminum chloride, based on the alpha, omega-diaryl alkane, at temperatures ranging from 2° C. to about 50° C. or higher, after which the mixture is agitated for a period of 2 to 48 hours or more at the same temperature. The mixture is then allowed to stand until the temperature reaches room temperature, after which the mixture is agitated for another period of time from 2 to 12 hours or more. The whole mixture can then be left to stand at room temperature for a time sufficient to permit a clear separation into 2 phases. The liquid is then decanted from the aluminum chloride, blended with benzene, and washed with dilute hydrochloric acid, sodium bicarbonate and water. The resulting benzene solution is then heated to remove the benzene by distillation, and to recover the reaction products.

The examples set forth hereinbelow exemplify the various conditions under which the reaction product which is useful as a viscosity index improving agent may be obtained.

*Example I.—Viscosity index improving agent obtained by aluminum chloride treatment of 1,9-diphenylnonane*

A mixture of 140 grams (0.5 mol) of 1,9-diphenylnonane, 2 cc. of chloroform (0.025 mol), and 5 grams of anhydrous aluminum chloride (0.038 mol) was agitated rapidly at a temperature of about 70° C. for a period of 6 hours. 1.5 grams of anhydrous aluminum chloride (0.013 mol) was added, after which the whole mixture was agitated for another 10 hours at the same temperature, followed by gradual cooling to room temperature; after which the mixture was agitated for 12 hours, followed by standing at room temperature for a period of 18 hours during which time 2 layers formed. After decantation from aluminum chloride, each layer was blended with benzene, washed with dilute hydrochloric acid, sodium bicarbonate and water. After water washing, the products were filtered and the benzene was removed by distillation. The aluminum chloride treatment thus yielded 2 fractions having the following properties:

|  | Upper Fraction | Lower Fraction |
| --- | --- | --- |
| $\eta_D$ | 1.5346 | 1.5370 |
| Viscosity at 100° F. (cs.) | 49 | 582 |
| Viscosity at 210° F. (cs.) | 8.7 | 45 |
| V.I. | 143 | 117 |
| Pour Point, °F. | −58 | +10 |

The upper fraction, which included unreacted 1,9-diphenylnonane, had greatly improved V.I. characteristics, showing an in situ formation of a V.I. improving agent.

The addition of 20%, by weight, of the lower fraction to 1,9-diphenylnonane, yielded a composition having a V.I. of 168. A 10% solution yielded a composition having a V.I. of 150.

The original 1,9-diphenylnonane has the following properties:

| | |
| --- | --- |
| Boiling point (at 0.4 mm. Hg.) | 172° C. |
| Boiling point (at 1.0 mm. Hg.) | 184–190° C. |
| R.I. $\eta_D$ | 1.5290 |
| Viscosity at 100° F. (cs.) | 8.00 |
| Viscosity at 210° F. (cs.) | 2.350 |
| V.I. | 124 |
| Pour point, ° F. | About +20 |
| $d_4^{20}$ | 0.9358 |

*Example II.—Viscosity index improving agent obtained by aluminum chloride treatment of 1,9-diphenylnonane*

A mixture of 140 grams (0.5 mol) of 1,9-diphenylnonane, 2 cc. of chloroform, and 7 grams (0.053 mol.) of anhydrous aluminum chloride was agitated violently at a temperature of about 110° C. for a period of 8 hours, after which the whole mixture was allowed to stand at room temperature overnight. 1.5 grams of anhydrous aluminum chloride was added, and the mixture was agitated at about 110° C. for a period of 4 hours, followed by standing at room temperature for a period of 18 hours. After decantation of the liquid from the aluminum chloride, the liquid was blended with diethylether, washed with dilute hydrochloric acid, sodium bicarbonate and water. After water washing, the product was filtered, and the product was distilled to remove the diethylether, a low boiling distillate, unreacted nonane, and to recover the reaction products. The distillation was carried out to a bottoms temperature of 380° C. at an absolute pressure of 1.4 mm. Hg. The aluminum chloride treatment described in this example yielded approximately 31%, by weight, of a distilled fraction No. 1, which was identified as unreacted 1,9-diphenylnonane; 23% of a fraction No. 2; and 46%, by weight, of a bottoms fraction characterized as follows:

|  | Fraction 2 | Bottoms |
| --- | --- | --- |
| Boiling Pt., ° C. (at 1.25 mm. Hg) | 306–323 |  |
| Viscosity at 100° F. (cs.) | 83 | 987 |
| Viscosity at 210° F. (cs.) | 10.3 | 56.7 |
| Pour point ° C. | −20 |  |
| V.I. | 113 | 110 |
| Mol Wt.: |  |  |
| Theory | [1] 483 | [2] 886 |
| Found | 468 | 847 |

[1] Calculated for:

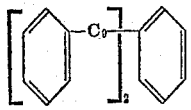

[2] Calculated for a polyalkyl aromatic material having an average of 5 benzene rings, including:

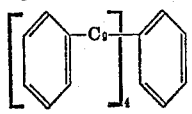

*Example III.—Viscosity index improving agent obtained by aluminum chloride treatment of 1,9-diphenylnonane*

A mixture of 140 grams (0.5 mol) of 1,9-diphenylnonane, 2 cc. of chloroform (0.025), and 5 grams (0.038 mol) of anhydrous aluminum chloride was agitated violently at a temperature of 2–5° C. for a period of 2 hours. 1.5 grams of anhydrous aluminum chloride (0.013 mol) was added, after which the whole mixture was agitated for another 2 hours at the same temperature, followed by gradual warming to room temperature. After the mixture had been agitated for 2 hours, it was allowed to stand at room temperature for a period of about 18 hours. After decantation of the liquid from the aluminum chloride the liquid was blended with benzene, washed with dilute hydrochloric acid, sodium bicarbonate, and water. After water washing, the product was filtered and heated to remove the benzene and unreacted 1,9-diphenylnonane by distillation to a bottoms temperature of 343° C. at an absolute pressure of 0.5 mm. Hg. The bottoms fraction, which represented approximately 35% of the original charge of nonane, had the following properties:

| | |
| --- | --- |
| $\eta_D$ | 1.5394 |
| Viscosity at 100° F. (cs.) | 76.77 |
| Viscosity at 210° F. (cs.) | 11.65 |
| V.I. | 134 |

For the purpose of determining the viscosity-improving characteristics of the product of Example III, the bottoms thus obtained were incorporated into 1,9-diphenylnonane (unreacted) to make a composition containing 34% bottoms plus 66% of 1,9-diphenylnonane. The resulting blend had a Viscosity Index of 159. This V.I. of 159 represents an increase of 35 points, since the original 1,9-diphenylnonane (as set forth in the data of Example I) had a V.I. of 124.

*Example IV.—Viscosity index improving agent obtained by aluminum chloride treatment of 1,9-diphenylnonane*

A mixture of 140 grams (0.5 mol) of 1,9-diphenylnonane, 2 cc. of chloroform (0.025), and 5 grams (0.038 mol) of anhydrous aluminum chloride was agitated violently at a temperature of 2–5° C. for a period of 2 hours. 1.5 grams of anhydrous aluminum chloride (0.013 mol) was added, after which the whole mixture was agitated for another 2 hours it was allowed to stand at room temperature for a period of about 18 hours. After decantation of the liquid from the aluminum chloride the liquid was blended with benzene, washed with dilute hydrochloric acid, sodium bicarbonate, and water. After water washing, the product was filtered and heated to remove the benzene and unreacted 1,9-diphenylnonane by distillation to a bottoms temperature of 320° C. at an absolute pressure of 0.5 mm. Hg. The bottoms fraction, which represented approximately 35% of the original charge of nonane, had the following properties:

| | |
| --- | --- |
| $\eta_D$ | 1.5411 |
| Viscosity at 100° F. (cs.) | 110.0 |
| Viscosity at 210° F. (cs.) | 14.4 |
| V.I. | 134 |

The bottoms fraction from Example IV, in a concentration of 33%, increases the V.I. of a California solvent refined naphthenic base mineral lubricating oil from 90 to 119.

The new compositions of matter obtained by the AlCl₃ treatment of alpha, omega-diphenyl alkanes as described herein may be represented by the following formula:

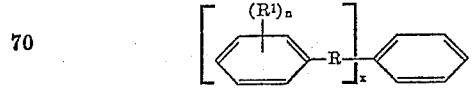

wherein R is a saturated hydrocarbon radical having from 6 to 12 carbon atoms, $R^1$ is a saturated hydrocarbon radical having from 1 to 4 carbon atoms; $n$ is a number from 0 to 3 and $x$ is a number from 2 to 6 or higher, wherein the average value for $x$ is from 2 to 6, as further described and exemplified hereinabove.

As V.I. improving agents, the new products described herein can be used in amounts of 1% to 20%, by weight, in a wide variety of oils, including mineral oils, such as naphthenic base, paraffin base, and mixed base oils derived from petroleum; synthetic oils, such as polymers of alkylene oxides; aromatic-type oils, such as alkylphenyl diethers, alkylbiphenyls, alkylbiphenyl ethers, polyalkyl terphenyls, polyphenyls, polyarylalkanes, dialkylbenzenes, aryl esters, etc.

I claim:

1. As a new composition of matter, a compound of the formula:

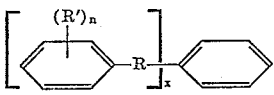

wherein R is a saturated hydrocarbon radical having from 6 to 12 carbon atoms, R′ is a saturated hydrocarbon radical having from 1 to 4 carbon atoms, $n$ is a number from 0 to 3, and $x$ is a number from 2 to 6, wherein one of the benzene rings is attached to the alpha carbon atom of said R radical and the other benzene ring is attached to the omega carbon atom of said R radical.

2. A compound of the formula:

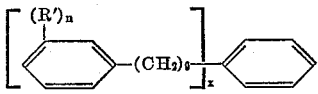

wherein R′ is a hydrocarbon radical having from 1 to 4 carbon atoms, $n$ is a number from 0 to 3, $x$ is a number from 2 to 6, and wherein the benzene rings are in the alpha and omega positions on the —(CH$_2$)$_9$— radical.

3. A compound of the formula:

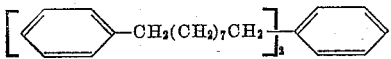

wherein the benzene rings are in the alpha and omega positions on the —(CH$_2$)$_9$— radical.

4. A compound of the formula:

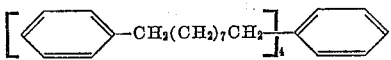

wherein the benzene rings are in the alpha and omega positions on the —(CH$_2$)$_9$— radical.

References Cited in the file of this patent
UNITED STATES PATENTS

| | | |
|---|---|---|
| 2,548,982 | Kemp | Apr. 17, 1951 |
| 2,614,080 | Welch | Oct. 14, 1952 |
| 2,752,404 | Polak | June 26, 1956 |
| 2,895,915 | Hewett et al. | July 21, 1959 |